Aug. 6, 1929.　　　J. CHRISTIE　　　1,723,723
LATCH FOR CAMERA FRONTS
Filed July 24, 1928
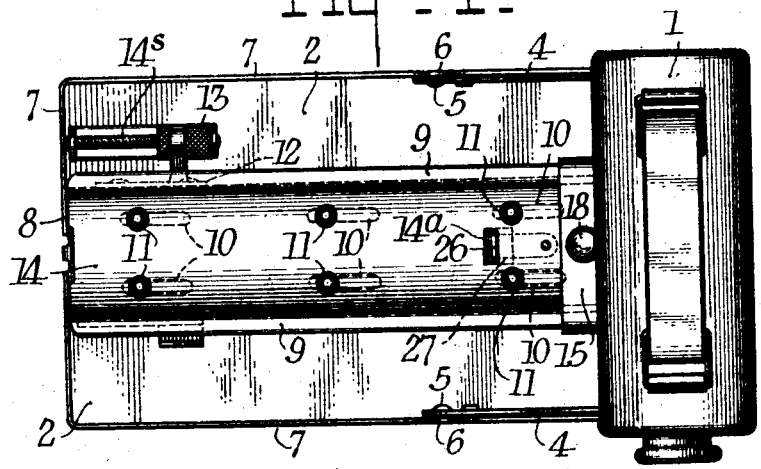
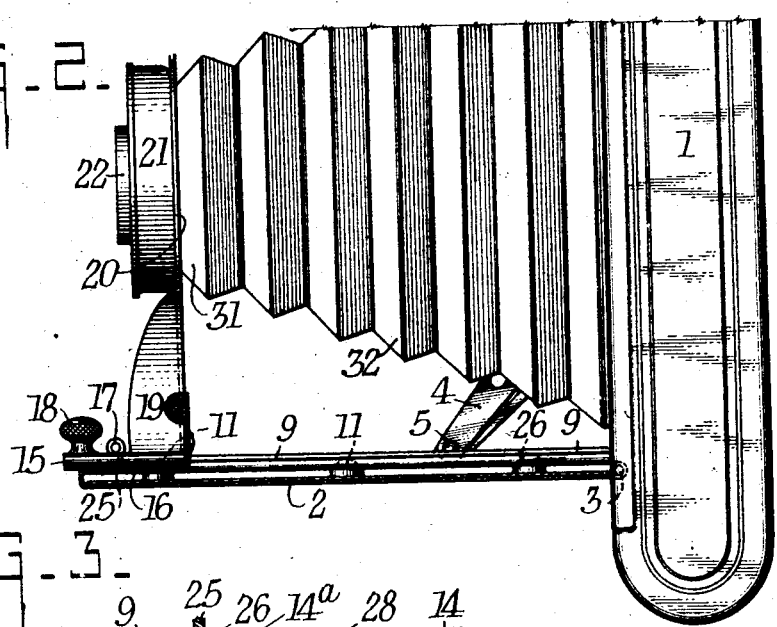
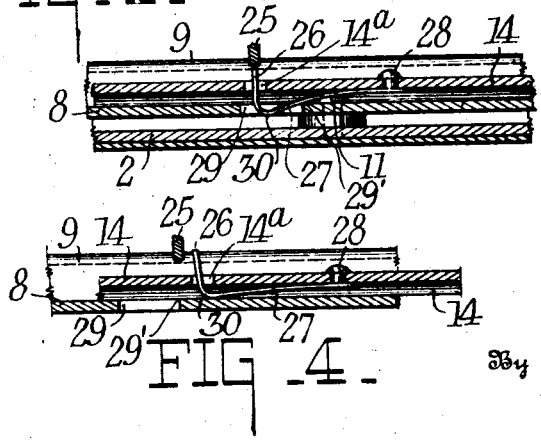
Inventor
John Christie,
By
Attorney Patented Aug. 6, 1929.

1,723,723

UNITED STATES PATENT OFFICE.

JOHN CHRISTIE, OF ROCHESTER, NEW YORK, ASSIGNOR TO EASTMAN KODAK COMPANY, OF ROCHESTER, NEW YORK, A CORPORATION OF NEW YORK.

LATCH FOR CAMERA FRONTS.

Application filed July 24, 1928. Serial No. 295,109.

This invention relates to photography, and more particularly to photographic cameras. One object of my invention is to provide a camera with a spring latch adapted to prevent the lens carriage from being moved off of the track in closing the camera until the parts are in the proper position. Another object is to provide a catch of the class described which is concealed to view, simple in construction, and easy to make and assemble. And other objects will appear from the following specification, the novel features being particularly pointed out in the claims at the end thereof.

Coming now to the drawings wherein like reference characters denote like parts throughout:

Fig. 1 is a top plan view of a camera having a platform and track constructed in accordance with and embodying a preferred form of my invention;

Fig. 2 is a fragmentary side elevation of parts in section of the camera shown in Fig. 1;

Fig. 3 is an enlarged detail section through line 3—3 of Fig. 1; and

Fig. 4 is an enlarged fragmentary section showing the latch mechanism in a different position from that shown in Fig. 3.

In the present embodiment of my invention there is a camera body 1 having a platform 2 hinged at 3 to the body, and being supported in an open position by means of side braces 4 pivoted at 5 to lugs 6 extending upwardly from a flange 7 which surrounds three sides of the camera platform 2.

The track structure is very similar to the track structure shown in Patent No. 1,651,743, Underwood, Dec. 6, 1927.

The track member 8 is provided with upwardly and outwardly formed flanges 9. The plate and flanges form a slidable rail which may be moved on the camera platform in the following manner:

The plate 8 is provided with a plurality of slots 10 through which studs 11 pass to the camera platform. A bracket 12 engages a knurled nut 13, which is movable on a fixed screw 14$^a$ to move the slidable rail in focusing the camera.

The focusing structure is the same as that shown in Patent No. 1,613,353, Kroedel, Jan. 4, 1927.

In order to cover up the slots and make a neater appearing camera a fixed cover plate 14 is attached to the platform 2 by means of the studs 11. This plate is shown in the drawings as being slightly curved in cross section, as also is shown in the Underwood patent above mentioned.

The slidable rail supports a lens carriage which may consist of parts 15 and 16 hinged together at 17. Part 15 is provided with a handle 18 by which the carriage may be drawn out upon the slidable rail, and part 16 supports on an upright bracket 19 a lensboard 20 to which the shutter 21 is affixed. One or more lens cells 22 may be attached in the usual manner. The parts just described constitute a sliding front for the camera.

To the rear of the lensboard 20 there is attached one end 31 of a bellows frame 32, the rear end of which is affixed in the camera body 1. In opening the camera handle 18 is drawn out causing the lens carriage to move on the slidable rail.

To focus the camera the nut 13 is turned and this moves the slidable rail, altering the distance between the lens carriage and a film contained in the camera. If the lens carriage is moved rearwardly on the slidable rail when this member has been moved for focusing, all or part of the lens carriage may be accidentally moved from that end of the slidable rail which lies close to the camera body. To prevent this I provide the following mechanism: A lug 25 is formed downwardly beneath the hinge 17, although this lug may be formed on any part of the lens carriage. This lug may strike against an upstanding end 26 of the spring arm 27 riveted at 28 to the fixed cover plate 14 and projecting through aperture 14$^a$. This spring normally tends to thrust downwardly, but its downward movement is limited by the plate 8 which forms the base of the slidable rail. An opening 29 is provided in plate 8 so that when the parts are in the position shown in Fig. 1 a bent portion 30 of the spring latch may drop into the aperture 29, this downward movement being limited by the edge 291 of the opening. When in this position, as best indicated in Fig. 2, lug 25 may slide freely over the top of the upwardly extending member 26.

But when, however, the slidable rail is moved, as indicated in Fig. 4, the opening 29 is moved away from the spring latch 27 and the edge 291 cams up on member 26 causing it to move into the path of lug 25, and preventing the lens carriage from being moved off of the end of the track.

By returning the slidable rail to its initial position, shown in Figs. 1 and 3, the latch member is again allowed to spring downwardly into the opening 29 and to permit member 25 to slide freely over the top of the latch so that the camera may be closed.

Having thus described my invention what I claim as new and desire to secure by Letters Patent is,—

1. In combination with the platform of a camera, a slidable rail thereon, a fixed cover plate over said rail lying between the edges thereof and being curved in cross section, a sliding front on said rail, a spring catch attached to the underside of the curved cover plate and normally out of the path of said front, and an edge on said slidable rail adapted to force said catch upwardly in the path of the sliding front when the rail is extended.

2. In combination with the platform of a camera, a slidable rail thereon, a fixed cover plate over said rail between the edges thereof, said cover plate being curved in cross section, a sliding front on said rail, a spring catch riveted on the underside of said curved fixed cover plate, said spring catch having an upwardly extending arm spring pressed from a position in which it may lie in the path of the sliding front on the rail, means on said slidable rail permitting said spring latch to move from the path of the sliding front, whereby the slidable front may pass freely over the top of said spring catch.

Signed at Rochester, New York, this 16 day of July, 1928.

JOHN CHRISTIE.